March 1, 1927.  
R. R. ROOT  
1,619,316  
AGRICULTURAL POWDER DISTRIBUTING DEVICE  
Filed Dec. 10, 1923
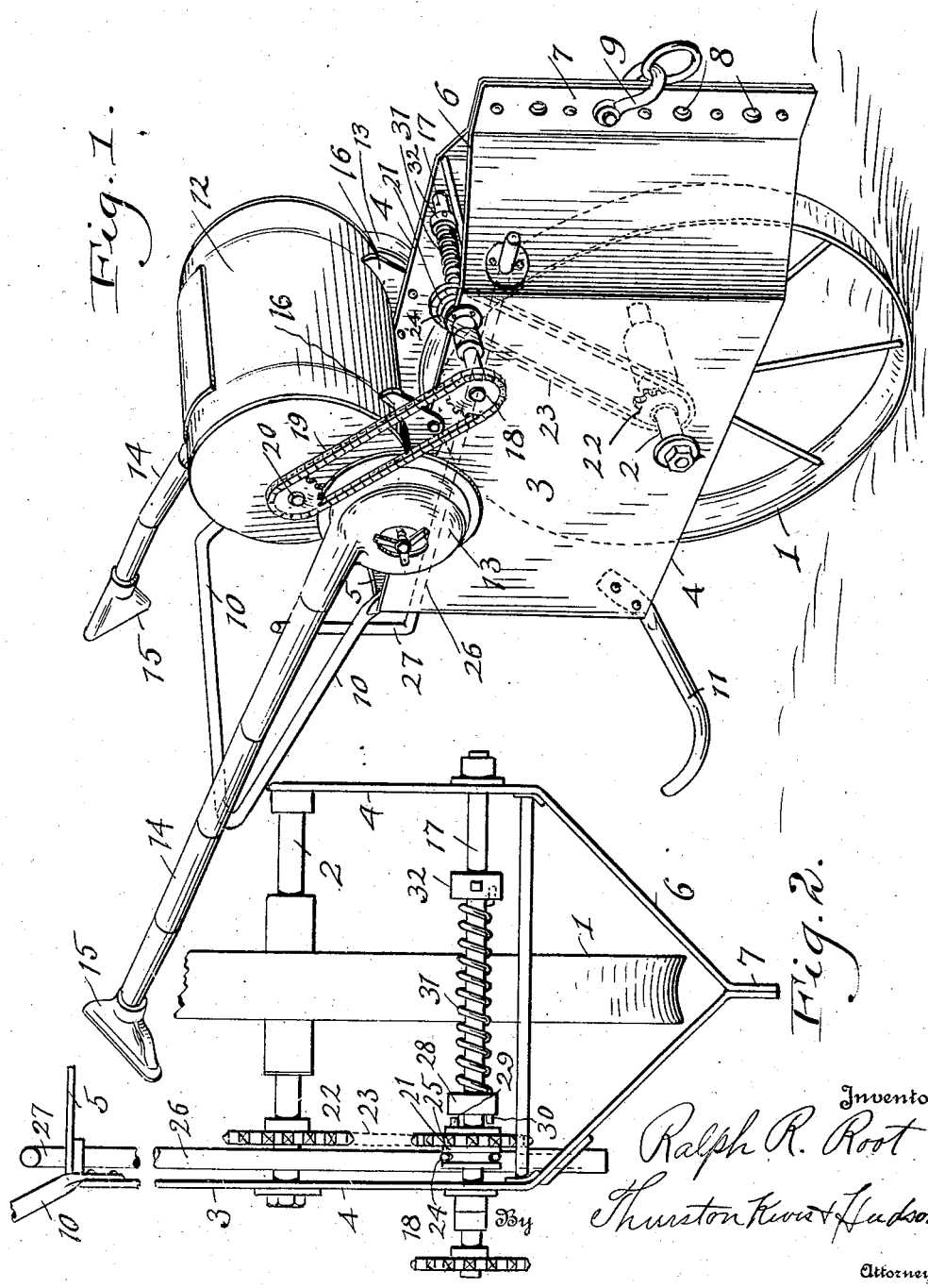
Inventor  
Ralph R. Root  
By Thurston Kwis & Hudson  
Attorneys Patented Mar. 1, 1927.

1,619,316

UNITED STATES PATENT OFFICE.

RALPH R. ROOT, OF LAKEWOOD, OHIO, ASSIGNOR TO THE ROOT MANUFACTURING COMPANY, OF CLEVELAND, OHIO, A CORPORATION OF OHIO.

AGRICULTURAL POWDER-DISTRIBUTING DEVICE.

Application filed December 10, 1923. Serial No. 679,597.

This invention relates to agricultural powder distributing devices, commonly known as powder dusters for dusting cotton and other plants with a dry powder insecticide. More specifically, the invention relates to a powder duster of the cart type in which the distributing mechanism is supported and driven from a wheeled vehicle adapted to be pushed or pulled between the rows of plants being dusted.

It is an object of the present invention to mount the powder distributing mechanism upon a single supporting wheel in such a manner that it may be readily moved between rows of plants being dusted and to provide means for driving the distributing mechanism from the supporting wheel.

A further object is to provide a wheeled support for the dusting mechanism which is adapted to be pushed or pulled between the rows of plants being dusted and which is adapted to be tilted as it is moved along to vary the angle of discharge of powder.

A further object is to provide driving connection between the supporting wheel and distributing mechanism which will apply the powder gradually to the distributing mechanism in starting.

A further object is to provide in the driving connections means for automatically disconnecting the distributing mechanism from the supporting and driving wheel in case there is excessive resistance to turning movement so that if the distributing mechanism should be for some reason out of order and offer excessive resistance to turning movement, the driving will be automatically disconnected before serious damage is done to the mechanism.

With the above and other objects in view, the invention may be said to comprise the mechanism illustrated in the accompanying drawings hereinafter described and particularly defined in the appended claims, together with such variations and modifications thereof as will be apparent to those skilled in the art to which the invention appertains.

Reference should be had to the accompanying drawings forming a part of this specification in which Fig. 1 is a perspective view of a machine embodying the invention; Fig. 2 is a fragmentary top plan view of the machine with the powder distributor removed.

Referring to the accompanying drawings, the supporting vehicle consists of a supporting wheel 1 which has its axle 2 journaled in a casing 3 which encloses the upper portion of the wheel. The casing 3 is formed from a single sheet of sheet metal which is bent to provide parallel side walls 4 and a rear wall 5 disposed at right angles to the side walls 4 and integral therewith. The free ends of the sheet are bent inwardly at an oblique angle at the forward end of the machine to form a tapered front portion 6 immediately in front of the wheel. The free edges of the two ends of the sheet overlapping to form a vertical flange 7 at the front and secured together by rivets or other equivalent fastening means. The flange 7 has a vertical row of perforations 8 in any one of which may be secured a clevis 9 by means of which the draft animal may be hitched to the vehicle. Secured to the rear corners of the casing and extending upwardly and rearwardly therefrom at the top is a U-shaped handle 10 by means of which the vehicle may be pushed or which may be utilized to tilt the vehicle while it is being drawn by a draft animal. To the lower rear corners of the casing 3 are attached supporting legs 11 which extend downwardly, rearwardly and outwardly from the casing, the legs 11 when resting on the ground forming with the supporting wheel 1 a stable support for the vehicle.

The casing 3 extends from below the axle 2 of the supporting wheel to above the top of the wheel and upon the top of the casing there is detachably mounted a powder distributing mechanism. This mechanism is not shown in detail herein since the distributing mechanism per se is disclosed and claimed in my co-pending application Serial No. 590,210, filed Sept. 23, 1922. This distributing mechanism comprises a drum 12 which extends transversely across the top of the casing 3 and is provided with suitable rotary agitating and feeding mechanism for delivering the powder to angularly adjustable fan casings 13 mounted on opposite ends of the drum. The fan casings 13 are provided with rearwardly extending spouts 14 which extend rearwardly and terminate in nozzles 15, the nozzles 15 being at some distance behind the rear end of the handle 10 so that the powder is discharged back to the operator. The spouts 15 may be adjusted vertically by adjusting the fan casings 13 so that the nozzles 15 may be disposed at the desired elevation. The distributing mechanism is supported by brackets 16 which are detachably connected to the side walls 4 of the casing.

Journaled adjacent the upper edges of the side walls 4 in front of the drum is a transverse shaft 17 which projects through one of the side walls and carries at its outer end a sprocket wheel 18 which drives a sprocket chain 19 which extends over a sprocket wheel 20 on the agitator shaft of the drum 12, the feeding devices and fans being driven by suitable gearing from the shaft 20. Within the casing a sprocket wheel 21 is slidably and rotatably mounted upon the shaft 17, the sprocket 21 being driven from a sprocket 22 fixed to the axle 2 by means of a sprocket chain 23. The sprocket wheel 21 has a grooved hub 24 which is engaged by a forked arm 25 carried by a rotatable shaft 26 which extends longitudinally of the casing and is journaled in the front and rear walls thereof. At its rear end the shaft 26 has an upwardly extending operating arm 27 by means of which the sprocket wheel may be shifted. The sprocket wheel co-operates with a clutch member 28 which is also rotatably and slidably mounted upon the shaft 17, the sprocket 21 and clutch member 28 having co-operating driving lugs 29 and 30 adapted to engage when the sprocket is shifted into engagement with the clutch member. The clutch member 28 is connected to one end of a coiled spring 31 which encircles the shaft 17, the opposite end of the spring being connected to a collar 32 fixed to the shaft 17. Whenever the sprocket wheel 21 is shifted into engagement with the clutch member, the shaft 17 is not immediately driven since the spring 31 must first wind up until it has sufficient tension to overcome the resistance to turning movement of the distributing mechanism, thus the powder is gradually applied to the distributing mechanism so that this mechanism is not started with a jerk as would be the case if direct driving connections were provided between the supporting wheel and distributing mechanism. If for any reason there is excessive resistance in the distributing mechanism to turning movement, the spring 31 will wind up until it pulls the clutch member 28 entirely out of engagement with the sprocket 21. This automatic disconnection of the driving mechanism will serve as a warning to the operator that the distributing mechanism is not working properly and will avoid injury to the distributing mechanism which might be caused by forceable operation with some part thereof out of order.

In operation the distributing device will be pushed or pulled between rows of plants, the spouts 15 having been first adjusted to position the nozzles 15 properly for the height of the plants being treated. In passing over uneven ground, the operator by tilting the distributor supporting casing about the axle 2 of the supporting wheel, may maintain the nozzles 15 at the proper elevation or he may raise and lower the nozzles while the machine is traveling along to properly dust plants of greater or less height than the average.

It may sometimes be desirable to take advantage of a breeze to dust several rows at one time. This may be done by swinging the spouts 14 above the tops of the plants and permitting the powder discharge therefrom to be blown across the rows.

Having described my invention, I claim:

1. A powder duster comprising a supporting wheel having an axle, a casing enclosing the upper portion of the wheel, said casing having side walls to which opposite ends of the axle are secured and which extend above the top of the wheel, a powder distributor comprising a drum extending across the top of the casing and detachably secured thereto and fan casings at the ends of the drum having rearwardly extending spouts, a handle secured to the rear end of the casing, and means for driving the distributor from the wheel.

2. A powder duster comprising a supporting wheel having an axle, a casing enclosing the upper portion of the wheel, said casing having side walls in which the axle is mounted and which extend above the top of the wheel, a U shaped handle extending rearwardly from the top of the casing, a powder distributor comprising a drum detachably secured to the top of the casing and extending transversely across the casing and fan casings at the ends of the drum having spouts extending rearwardly beyond the end of the handle, supporting legs extending downwardly, rearwardly and outwardly from the rear corners of the casing, and means for driving the distributor from the supporting wheel.

3. A powder duster comprising a supporting wheel having an axle, a casing enclosing the upper portion of the wheel, said casing having parallel side walls which extend from below the axle of the wheel to above the top thereof and to which the ends of the axle are secured, a powder distributor detachably mounted upon the top of the casing, said distributor having angularly adjustable spouts extending rearwardly and outwardly from opposite sides of the casing, means for driving said distributor from the supporting wheel, a handle secured to the rear end of the casing, and a clevis adjustably connected to the forward end of the casing.

4. A powder duster comprising a supporting wheel having an axle, a sheet metal casing enclosing the upper portion of the wheel, said casing extending from below the axle of the wheel to above the top thereof and having parallel side walls in which the axle is mounted, the forward end of the casing being tapered and terminating in a vertically extending flange, said flange having a row of openings adapted to receive a clevis, a handle secured to the rear end of the casing, supporting legs secured to the rear end of the casing at the bottom thereof and extending downwardly rearwardly and outwardly therefrom, a distributor detachably mounted upon the top of the casing, said distributor having rearwardly extending spouts, driving connections between the supporting wheel and distributor, and a controlling member extending to the rear end of the casing for establishing or disestablishing the driving connection between the wheel and distributor.

5. A powder duster comprising a supporting wheel, a casing carried by the wheel, a powder distributor mounted on the casing and driving means connecting the supporting wheel and distributor, said driving means including means for gradually applying the power to the distributor upon rotation of the wheel.

6. A powder duster comprising a supporting wheel, a casing carried by the wheel, a a powder distributor mounted on the casing, a shaft journaled in the casing, a driving member rotatably mounted on said shaft; means for driving said member from the supporting wheel, a clutch member slidably and rotatably mounted on the shaft and adapted to move into and out of engagement with the driving member, a coil spring connecting said clutch member to the shaft, and means for driving the distributor from said shaft.

7. A powder duster comprising a supporting wheel having an axle, a sheet metal casing within which the wheel is mounted, said casing formed from a single sheet and having a rear end wall and side walls bent at right angles to the rear wall, the forward portions of the side wall being bent inwardly at an obtuse angle to form a tapered front end, the free edges of the sheet being secured together at the front, said casing extending above the top of the wheel, a clevis adjustable to different heights at the forward end of the casing, a handle extending rearwardly from the rear end of the casing at the top thereof, a distributor detachably mounted upon the top of the casing and having spouts extending rearwardly from the distributor and adapted to extend beyond the rear end of the handle, and means for driving the distributor from the wheel.

8. A powder duster comprising a supporting wheel, a casing mounted thereon, a distributor mounted on the casing, means for driving the distributor from the wheel and controlling means for the driving means for applying power gradually to the distributor and for automatically disconnecting the driving means upon excessive resistance to turning movement.

In testimony whereof, I hereunto affix my signature.

RALPH R. ROOT.